United States Patent Office 3,394,151
Patented July 23, 1968

3,394,151
1,3,5(10),8(14),9(11),15-GONAHEXAEN-17 ONES AND INTERMEDIATES OBTAINED IN THE PREPARATION THEREOF
Robert D. Hoffsommer, Jr., and David Taub, Metuchen, and Norman L. Wendler, Summit, N.J., assignors to Merck & Co., Inc., Rahway, N.J., a corporation of New Jersey
No Drawing. Filed Aug. 30, 1965, Ser. No. 483,819
21 Claims. (Cl. 260—397.4)

ABSTRACT OF THE DISCLOSURE

The invention disclosed herein is concerned generally with a novel synthesis of intermediate compounds useful in the synthesis of known steroids of the estrane series which have utility in the pharmaceutical field as estrogenic and progestational agents. More particularly, this invention relates to a synthesis of 3-hydroxy or substituted oxy-13-lower alkyl-1,3,5(10)-gonatrien-17-one compounds having hydrogen atoms on the C-8, C-9 and C-14 carbon atoms in the alpha-position, such as 8-isoestrone-3-ethers, which may be converted to the corresponding 8-dehydro compounds, such as 8-dehydroestrone-3-ethers, which latter compounds may be reduced to the corresponding 3-hydroxy or substituted oxy-13-lower alkyl-1,3,5(10)-gonatrien-17-one compounds having hydrogen atoms on the C-9 and C-14 carbon atoms in the alpha-position and a hydrogen atom on the C-8 carbon atom in the beta-position, such as estrone-3-ethers. In this synthesis, this starting material is 2-lower alkyl-4-bromocyclopentane-1,3-dione, or a 2-lower alkyl-4-hydroxycyclopentane-1,3-dione which latter is first converted to 2-lower alkyl-4-lower acyloxycyclopentane-1,3-dione; this 2-lower alkyl-4-lower acyloxy or bromocyclopentane-1,3-dione is reacted with a 1-vinyl-1-hydroxy-6-hydroxy or substituted oxy-1,2,3,4-tetrahydronaphthalene or a 6-hydroxy or substituted oxy-1,2,3,4-tetrahydronaphthylidene ethyl sulfonium salt, thereby forming a 3-hydroxy or substituted oxy-13-lower alkyl-8,14-seco-1,3,5(10),9(11),15-gonapentaene-14,17-dione which is reacted with a dehydrating agent to form 3-hydroxy or substituted oxy - 13 - lower alkyl-1,3,5(10),8(14),9(11),15-gonahexaen-17-one which, upon catalytic hydrogenation is converted to the corresponding aforesaid 3-hydroxy or substituted oxy-13-lower alkyl-1,3,5(10)-gonatrien-17-one compound.

---

The novel synthesis of this invention starting with the reaction of a 2-lower alkyl-4-lower acyloxy or bromocyclopentane-1,3-dione with a 1-vinyl-1-hydroxy-6-hydroxy or substituted oxy-1,2,3,4-tetrahydronaphthalene or a 6-hydroxy or substituted oxy - 1,2,3,4 - tetrahydronaphthylidene ethyl sulfonium salt; may be schematically represented as follows; wherein $R_1$ is a lower alkyl substituent, preferably having not more than five carbon atoms; $R_2$ is hydrogen, a lower cycloaliphatic, a straight or branch-chained lower alkyl substituent, preferably having not more than five carbon atoms, an aryl, alkaryl or aralkyl substituent in which the alkyl portion has preferably not more than five carbon atoms, or a heterocyclic substituent, such as tetrahydropyranyl substituent; Z is a lower acyloxy or bromine; Y is a substituent of the formula:

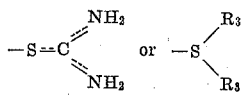

in which each $R_3$ is a lower alkyl substituent, preferably having not more than five carbon atoms; and X is an organic or mineral acid anion:

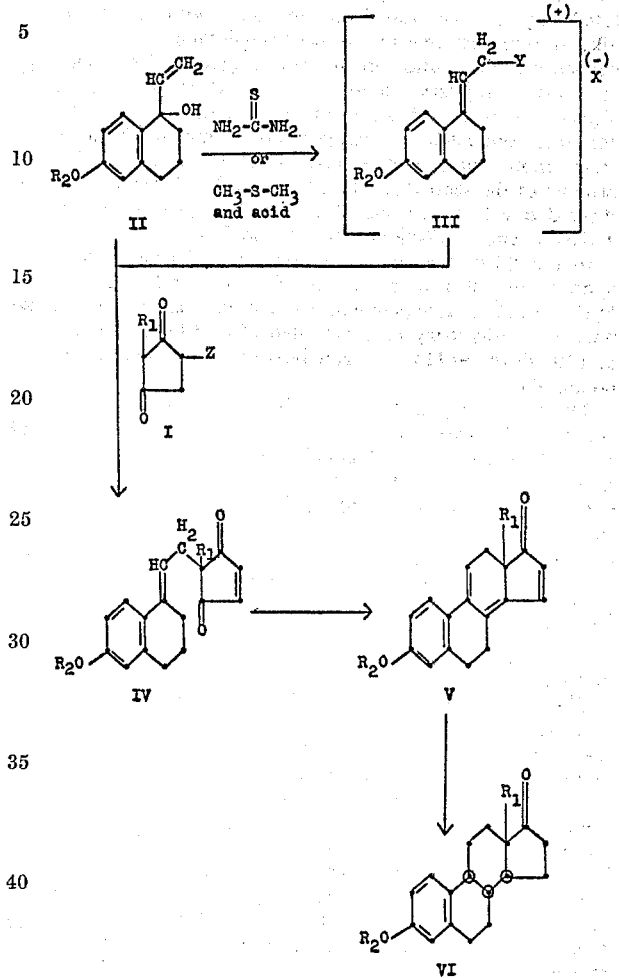

The first step in the novel synthesis of this invention is the preparation of a 2-lower alkyl-4-lower acyloxy or bromocyclopentane-1,3-dione (Compound I). A 2-lower alkyl-4-lower acyloxycyclopentane-1,3-dione may be prepared by acylating with a lower aliphatic acid anhydride a 2-lower alkyl-4-hydroxycyclopentane-1,3-dione. A 2-lower alkyl-4-bromocyclopentane-1,3-dione may be prepared by the bromination of a 2-lower alkylcyclopentane-1,3-dione with bromine in solution in acetic acid.

The second step in the synthesis is the reaction of a 2-lower alkyl 4-lower acyloxy or bromocyclopentane-1,3-dione with a 1-vinyl-1-hydroxy-6-hydroxy or substituted-oxy-1,2,3,4-tetrahydronaphthalene (Compound II) or with a sulfonium salt, more particularly, with a 6-hydroxy or substituted-oxy-1,2,3,4-tetrahydronaphthylidene ethyl isothio-uronium salt or a 6-hydroxy or substituted-oxy-1,2,3,4-tetrahydronaphthylidene ethyl dialkyl sulfonium salt (Compound III).

The formation of sulfonium salt, more particularly, a 6-hydroxy or substituted-oxy-1,2,3,4-tetrahydronaphthylidene ethyl isothiouronium salt or a 6-hydroxy or substituted-oxy-1,2,3,4-tetrahydronaphthylidene ethyl dialkyl sulfonium salt, is accomplished by the reaction of a 1-vinyl-1-hydroxy-6-hydroxy or substituted-oxy-1,2,3,4-tetrahydronaphthalene with thiourea or a dialkyl sulfide in the presence of a mineral acid, such as hydrochloric, sulfuric or phosphoric acid, an aliphatic acid, such as acetic, propionic, chloracetic or trifluoroacetic acid, or an aromatic acid, such as benzoic acid.

The reaction of the sulfonium salt with a 2-lower alkyl-4-lower acyloxy or bromocyclopentane-1,3-dione is carried out in the presence of an inert organic solvent, a mixture of water and an organic solvent or water alone. The reaction of a 1-vinyl-1-hydroxy-6-hydroxy or substituted oxy-1,2,3,4-tetrahydronaphthalene with a 2-lower alkyl-4-lower acyloxy or bromocyclopentane-1,3-dione is carried out in solution in an inert organic solvent such as a lower aliphatic alcohol, or a mixture of a lower aliphatic alcohol and an aromatic hydrocarbon. The reaction is conducted at a temperature within the range of from about room temperature to about 140° C. The product of the second reaction step is a 3-hydroxy or substituted oxy-13-lower alkyl-8,14-seco-1,3,5(10),9(11),15-gonapentaene-14,17-dione (Compound IV).

In the third step of the reaction, the C-ring of a 3-hydroxy or substituted oxy-13-lower alkyl-8,14-seco-1,3,5(10),9(11),15-gonapentaene-14,17-dione is closed to provide a 3-hydroxy or substituted oxy-13-lower alkyl-1,3,5(10),8(14),9(11),15 - gonahexaen - 17 - one (Compound V).

The fourth step in the synthesis is the catalytic hydrogenation of 3-hydroxy or substituted oxy-13-lower alkyl-1,3,5(10),8(14),9(11),15-gonahexaen-17-one to provide a 3-hydroxy or substituted oxy-13-lower-alkyl-1,3,5(10)-gonatrien-17-one compound having hydrogen atoms on the C–8, C–9, and C–14 carbon atoms in the alpha-position (Compound VI).

Compound VI may be dehydrogenated, by the use of a reagent such as chloranil, to provide 3-hydroxy or substituted oxy-13-lower alkyl-1,3,5(10),8-gonatetraen-17-one having a hydrogen on the C–14 carbon atom in the alpha-position.

The $\Delta^8$-double bond of 3-hydroxy or substituted oxy-13-lower alkyl-1,3,5(10),8-gonatetraen-17-one may be reduced with potassium in liquid ammonia according to a method described in a publication in J. Org. Chem., vol. 28, page 1092 (1963), to provide a 3-hydroxy or substituted oxy-13-lower alkyl-1,3,5(10)-gonatrien-17-one compound having hydrogen atoms on the C–9 and C–14 carbon atoms in the alpha-position and a hydrogen atom on the C–8 carbon atom in the beta-position. The latter compounds which are 3-substituted oxy-compounds may be readily converted to 3-hydroxy-compounds by known procedures, such as by treatment with pyridine hydrobromide at elevated temperatures.

The acylation of a 2-lower alkyl-4-hydroxyclopentane-1,3-dione with a lower aliphatic acid anhydride may be conveniently accomplished by dissolving a 2-lower alkyl-4-hydroxycyclopentane-1,3-dione in the aliphatic acid anhydride and pyridine and keeping the reaction mixture at room temperature for about 18 hours. The residue is then concentrated to dryness under reduced pressure and the residue is dissolved in an aqueous solution of the aliphatic acid corresponding to the acid anhydride. This solution is heated on the steam bath for about 90 minutes and then the solvent is removed by distillation under reduced pressure. The reaction product may be isolated by triturating the residue with benzene-chloroform solvent mixture and filtering to remove the insoluble substances. The filtrate is concentrated to dryness by distillation under reduced pressure and the residue is triturated with ether. The ether insoluble residue is the desired 2-lower alkyl-4-lower acyloxyclopentane-1,3-dione.

2-lower alkyl-4-bromocyclopentane - 1,3 - dione compounds may be conveniently prepared by adding a solution of bromine in acetic acid dropwise to a stirred solution of a 2-lower alkylcyclopentane-1,3-dione in acetic acid and stirring the solution for about two hours while the temperature is maintained at about room temperature. The reaction product may be isolated by removing the solvents by distillation under reduced pressure. The residue is substantially pure 2-lower alkyl-4-bromocyclopentane-1,3-dione.

The reaction of a 2-lower alkyl-4-lower acyloxy or bromocyclopentane-1,3-dione with a 1-vinyl-1-hydroxy-6-hydroxy or substituted oxy-1,2,3,4-tetrahydronaphthalene may be conveniently accomplished by reacting substantially equimolar amounts of the two reactants in a polar solvent, such as methanol, ethanol, tertiary-butanol, or a mixed solvent, such as methanol, ethanol or tertiary-butanol and aromatic hydrocarbon, such as benzene, toluene or xylene, at a temperture within the range from about room temperature to 140° C., cooling the reaction mixture, concentrating under vacuum, adding a non-polar organic solvent, such as ether, to precipitate any unreacted dicarbonyl alicyclic compound, removing the precipitated dicarbonyl alicyclic compound by filtration, washing the precipitate with ether, combining the ether wash with the orginal filtrate, washing the combined ether solution with an aqueous solution of a weak base, such as potassium bicarbonate, drying the ether solution, and concentrating to dryness, preferably under vacuum. The residue of 3-hydroxy or substituted oxy-8,14-seco-13-lower alkyl-1,3,5(10),9(11),15-gonapentaene-14,17-dione may be purified by crystallization from a suitable solvent, such as an ether-hexane mixture.

A sulfonium salt, more particularly, a 6-hydroxy or substituted oxy-1,2,3,4-tetrahydronaphthylidene ethyl isothiouronium salt or a 6-hydroxy or substituted oxy-1,2,3,4-tetrahydronaphthylidene ethyl dialkyl sulfonium salt, may be conveniently prepared by reacting 1-vinyl-1-hydroxy-6-hydroxy or substituted oxy-1,2,3,4-tetrahydronaphthalene with thiourea or with a dialkyl sulfide, such as dimethyl sulfide or diethyl sulfide, in glacial acetic acid solution. If a sulfonium salt of a mineral acid or a sulfonium salt of an organic acid other than acetic acid is to be formed, the reaction is conducted in solution in the organic acid alone if that acid is liquid at room temperature, or in solution in an inert organic solvent in which all of the ingredients are soluble, such as ether, dioxane, benzene or toluene. If the sulfonium salt is to be isolated, it is preferred that at least a 20% excess amount of 1-vinyl-1-hydroxy-6-hydroxy or substituted oxy-1,2,3,4-tetrahydronaphthalene be present in the reaction mixture. The reaction is conducted at a temperature of from about 15° C. to about 40° C. The reaction is completed after the reaction mixture is stirred for about one to four hours. To isolate the sulfonium salt, the solvents are removed by distillation under reduced pressure and the residue crystallized from a suitable solvent, such as ether or acetone. If the only solvent present is acetic acid and the sulfonium acetate is formed, the sulfonium acetate is precipitated upon the addition of ether to the reaction mixture and the sulfonium acetate is removed by filtration. If the sulfonium salt is the salt of an inorganic acid, the salt precipitates from the reaction mixture as it is formed and may be removed by filtration and crystallized from a suitable solvent such as acetone.

The condensation of a sulfonium salt, more particularly, a 6-hydroxy or substituted oxy-1,2,3,4-tetrahydronaphthylidene ethyl isothiouronium salt or a 6-hydroxy or substituted oxy-1,2,3,4-tetrahydronaphthylidene ethyl dimethyl sulfonium salt, with a 2-lower alkyl-4-lower acyloxy or bromocyclopentane-1,3-dione is conveniently accomplished by dissolving the reactants in an organic solvent in which both reactants are soluble, more particularly, a lower aliphatic alcohol, such as tertiary-butanol, acetonitrile, tetrahydrofuran, dimethyl sulfoxide, dimethylformamide, dioxane, an ether-water mixture or water alone. The reaction is conducted at a temperature of from about room temperature to the refluxing temperature of the reaction mixture. The reaction is most advantageously conducted in solution in tertiary-butanol at reflux temperature or in a water-ether solvent mixture at room temperature. The reaction mixture is stirred, preferably under a blanket of nitrogen, and is complete after stirring from about one to five hours. To isolate the product from the reaction mixture, the reaction mixture is cooled to room temperature and water is added. The resulting mixture is extracted with ether, the ether extract is washed with potassium bicarbonate solution and then with saturated sodium chloride solution. The ether solution is dried over magnesium sulfate and the ether is removed by distillation under reduced pressure. The residue of crude 3-hydroxy or substituted oxy-8,14-seco-13-lower alkyl-1,3,5(10),9(11),15 - gonapentaene - 14,17 - dione may be purified by crystallization from a suitable solvent such as methanol or ether. If the reaction is conducted in an ether-water solvent mixture, it is conducted at a temperature from about room temperature to the boiling point of ether and after the reaction is complete, the reaction mixture is cooled to room temperature and the ether layer is removed. The water layer is then extracted with ether, the extract is combined with the original ether layer and the ether solution is washed with aqueous sodium bicarbonate and then with saturated sodium chloride solution. The ether solution is dried over magnesium sulfate and the ether is removed by distillation under reduced pressure. The residue of crude 3-hydroxy or substituted oxy-8,14-seco-13-lower alkyl-1,3,5(10),9(11),15-gonapentaene-14,17-dione is crystallized from a suitable solvent, such as methanol or ether.

In one modification, the sulfonium salt is not isolated in pure form but the reaction mixture containing the sulfonium salt is concentrated to dryness by distillation under reduced pressure and a suitable solvent, such as solvents listed above as suitable for use in the second-step reaction, and the cycloaliphatic-1,3-diketone are added to the crude residue containing the sulfonium salt. In this modification, it is preferred that equimolar amounts of the reactants be used in the formation of the sulfonium salt. The condensation reaction, including isolation of the reaction product, is then carried out as described above.

The C-ring of Compound IV may be conveniently closed with the elimination of one molecule of water by keeping a solution of Compound V in a lower aliphatic alcohol, such as methanol or ethanol, in the presence of hydrochloric acid at a temperature of from about 20° C. to about 50° C.; by heating a solution of the compound in an inert solvent, such as benzene, in the presence of a dehydrating agent such as anhydrous para-toluenesulfonic acid or phosphorus pentoxide acid at a temperature of about 60° C.; or by keeping a solution of the compound in formic acid at a temperature of about 15° to about 20° C. for about one hour. In either method of ring-closure and dehydration the product may be isolated, when no water-insoluble solvent is present, by cooling the reaction mixture and adding it to iced water and then separating the precipitated reaction product. When water-insoluble solvent is present, the product may be isolated by separating the solvent layer, extracting the aqueous layer with a solvent, such as benzene, adding the extract to the solvent layer, washing the solvent solution with a basic solution, such as an aqueous sodium carbonate solution, and filtering. The solvent is removed by distillation under reduced pressure. The product may be purified, if desired, by recrystallization from a suitable solvent such as ethyl acetate, or methanol. The reaction product is Compound V.

Compound V may be conveniently hydrogenated at the $\Delta^{8(14),9(11),15}$-double bonds by shaking a solution of the compound in a solvent, such as benzene, toluene, xylene, ethanol, or ethyl acetate, containing suspended palladised charcoal at a temperature of from about room temperature to 40° C. and one atmosphere of hydrogen until three molecular equivalents of hydrogen have been absorbed. The reduction product, Compound VI, which has hydrogen atoms on the C–8, C–9 and C–14 carbon atoms in the alpha-position, may be isolated by filtering the reaction mixture and removing the solvent from the filtrate by distillation under reduced pressure and purified by crystallization of the residue from a suitable solvent, such as methanol. A 3-benzyloxy or substituted benzyloxy group in Compound VI is converted by the hydrogenation to a 3-hydroxy group. Compound VI may be dehydrogenated to form a $\Delta^8$-double bond by refluxing a solution of that compound in a lower aliphatic alcohol, preferably tertiary-butanol, containing chloranil, under nitrogen. The reaction product may be conveniently isolated by filtering the reaction mixture, removing the aliphatic alcohol by distillation under reduced pressure and dissolving the residue in chloroform. The chloroform solution is allowed to stand overnight and then filtered to remove tetrachlorohydroquinone. The resulting solution is washed repeatedly with water, dried over sodium sulfate, and the solvent is removed by distillation under reduced pressure. The residue is a 3-hydroxy or substituted oxy-13-lower alkyl-1,3,5(10),8-gonatetraen-17-one compound which has a hydrogen atom on the C–14 carbon atom in the alpha-position, and may be purified by dissolving in methanol, treating the methanol solution with charcoal, removing the charcoal by filtration and concentrating the methanol solution until crystallization occurs. Further purification may be accomplished by recrystallization from a suitable solvent, such as ethyl acetate.

The following examples illustrate methods of carrying out the present invention, but it is to be understood that these examples are given for purposes of illustration and not of limitation.

Example 1.—2-methyl-4-bromocyclopentane-1,3-dione

A solution of 1.9 g. of bromine in 10 ml. of acetic acid is added dropwise to a stirred solution of 1.12 g. of 2-methylcyclopentane-1,3-dione in 15 ml. of acetic acid. The temperature of the reaction mixture is maintained from about 15° C. to about 20° C. during the addition, which requires about one hour. After addition is complete, the mixture is stirred for two hours at room temperature and then 50 ml. of toluene are added. The solvents are removed from the reaction mixture by distillation under reduced pressure and the residue is flushed twice with 20 ml. portions of toluene and then brought to dryness by distillation of the solvent present under reduced pressure. The residue is 2-methyl-4-bromocyclopentane-1,3-dione.

Example 2.—2-methyl-4-acetoxycyclopentane-1,3-dione

A solution of 6.21 g. of 2-methyl-4-hydroxy-cyclopentane-1,3-dione in 12 ml. of acetic anhydride and 60 ml. of pyridine is kept at room temperature for 18 hours. The solvent is removed by distillation under reduced pressure, and the residue is dissolved in 60 ml. of acetic acid and 60 ml. of water. The solution is heated on a steam bath for 90 minutes and the solvents are then removed by distillation under reduced pressure. The residue is triturated with 60 ml. of benzene and 40 ml. of chloroform. The solution is filtered and the filtrate is concentrated to dryness by distillation under reduced pressure. The residue is triturated with ether and filtered. 4.43 grams of ether insoluble 2-methyl - 4 - acetoxycyclopentane-1,3-dione having a melting point of 106–109° C. are obtained.

Example 3.—6-methoxy-1,2,3,4-tetrahydronaphthylidene ethyl isothiouronium acetate A solution of 3.06 g. of 1-vinyl-1-hydroxy-6-methoxy-1,2,3,4 - tetrahydronaphthalene and 0.76 g. of thiourea in 12 ml. of acetic acid is stirred at 25° C. for four hours. The mixture is diluted with 60 ml. of ether and the precipitate of 6-methoxy-1,2,3,4 - tetrahydronaphthylidene ethyl isothiouronium acetate is collected by filtration. 1.69 grams of the product, having a melting point of 123–127° C., are obtained.

Analysis.—Calculated for $C_{16}H_{22}O_3N_2S$: C, 59.60; H, 6.88; N, 8.69; S, 9.95. Found: C, 59.87; H, 6.28; N, 8.85; S, 9.03.

U.V. spectrum (methanol): $\lambda_{max.}$ 275 m$\mu$ ($\epsilon$ 19,500), 300 m$\mu$ ($\epsilon$ 8,650).

The filtrate is concentrated to dryness under reduced pressure and ether is added. An additional 900 mg. of product is crystallized from the ether solution. This material has a melting point of 122–126° C.

A solution of 10.1 g. of 1-vinyl-1-hydroxy-6-methoxy-1,2,3,4-tetrahydronaphthalene and 3.2 g. of thiourea in 35 ml. of acetic acid is stirred at room temperature for 18 hours. The reaction mixture is concentrated to dryness and the residue is crystallized from ether. 9.16 grams of crystalline 6-methoxy - 1,2,3,4 - tetrahydronaphthylidene ethyl isothiouronium acetate is obtained which has a melting point of 127–130° C.

Example 4.—6-methoxy-1,2,3,4-tetrahydronaphthylidene ethyl isothiouronium chloride A solution of 75 mg. of hydrogen chloride in 4 ml. of ether is added dropwise to a stirred mixture of 817 mg. of 1 - vinyl - 1 - hydroxy-6-alkoxy-1,2,3,4-tetrahydronaphthalene, 152 mg. of thiourea and 5 ml. of dry ether. The mixture is stirred at 25° C. for 90 minutes after addition is complete. The precipitate of crystalline 6-methoxy-1,2,3,4 - tetrahydronaphthylidene ethyl isothiouronium chloride, which forms during the reaction, is collected by filtration. The crystalline product has a melting point of 153–158° C.

U.V. spectrum (methanol): $\lambda_{max.}$ 273 m$\mu$.

Example 5.—6-methoxy-1,2,3,4-tetrahydronaphthylidene ethyl dimethyl sulfonium acetate A solution of 3.00 g. of 1-vinyl-1-hydroxy-6-methoxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-methoxy-1,2,3,4-tetrahydronaphthylidene ethyl dimethyl sulfonium acetate and is purified by crystallization from ether.

Example 6.—3-methoxy-13-methyl-8,14-secogona-1,3,5(10),9(11),15-pentaene-14,17-dione A mixture of 500 mg. of 1-vinyl-1-hydroxy-6-methoxy-1,2,3,4-tetrahydronaphthalene, 400 mg. of 2-methyl-4-bromocyclopentane-1,3-dione and 200 mg. of sodium acetate in 10 ml. of tertiary-butanol is refluxed under nitrogen for six hours. The mixture is cooled and the solvent is removed by distillation under reduced pressure. The residue is triturated with ether and filtered. The ether filtrate is washed with 5% aqueous potassium bicarbonate solution and then with saturated aqueous sodium chloride solution dried over magnesium sulfate, and filtered. The solvent is removed from the filtrate by distillation under reduced pressure. The residue is 3-methoxy-13-methyl - 8,14 - secogona-1,3,5(10),9(11), 15-pentaene-14,17-dione and is dissolved in benzene-petroleum ether solvent. This solution is chromatographed on magnesium silicate (Florisil). Elution with benzene gives a purified product.

Example 7.—3-methoxy-8,14-seco-13-methylgona-1,3,5(10),9(11),15-pentaene-14,17-dione A mixture of 1.00 g. of 6-methoxy-1,2,3,4-tetrahydronaphthylidene ethyl isothiouronium acetate and 0.53 g. of 2 - methoxy - 4 - acetoxycyclopentane - 1,3 - dione, 20 ml. of ether and 20 ml. of water is stirred at 25° C. for four hours. The ether and water are separated and the aqueous layer is extracted with ether. The ether extract and the ether layer are combined and washed with 5% aqueous potassium bicarbonate solution and then with saturated aqueous sodium chloride solution. The ether solution is dried over magnesium sulfate, filtered, and the ether is removed by distillation under reduced pressure. The residue is triturated with hexane and filtered. The insoluble 3-methoxy - 8,14 - seco-13-methylgona-1,3,5 (10),9(11),15-pentaene-14,17-dione obtained on filtration has a melting point of 82–85° C.

Example 8.—3-methoxy-13-methyl-8,14-secogona-1,3,5(10),9(11),15-pentaene-14,17-dione A mixture of 500 mg. of 1-vinyl-1-hydroxy-6-methoxy-1,2,3,4-tetrahydronaphthalene and 415 mg. of 2-methyl-4-acetoxycyclopentalene-1,3-dione in 5 ml. of tertiary-butanol is stirred at room temperature for 42 hours. The solution is complete within the first 20 minutes of stirring. The solvents are removed by distillation under reduced pressure and the residue is taken up in ether. The ether solution is washed with 5% aqueous potassium bicarbonate solution, washed with saturated aqueous sodium chloride solution, dried over magnesium sulfate, and filtered. The solvent is removed from the filtrate by distillation under reduced pressure. The residue is 3-methoxy-13-methyl - 8,14 - secogona - 1,3,5(10),9(11),15-pentaene - 14,17-dione and is dissolved in benzene - petroleum ether solvent. This solution is chromatographed on magnesium silicate (Florisil). The column is eluted with benzene, the benzene is removed from the benzene eluate by distillation under reduced pressure and the residue is crystallized from an ether-hexane solvent mixture. The crystallized material has a melting point of 83–85° C.

Analysis.—Calculated for $C_{19}H_{20}O_3$: C, 77.00; H, 6.80. Found: C, 77.08; H, 6.68.

U.V. spectrum (methanol): $\lambda_{max.}$ 295 m$\mu$ ($\epsilon$ 4,830), 264 m$\mu$ ($\epsilon$ 24,200), 213 m$\mu$ ($\epsilon$ 37,200).

Example 9.—3-methoxy-8,14-seco-13-methylgona-1,3,5(10),9(11),15-pentaene-14,17-dione A mixture of 1.00 g. of 6-methoxy-1,2,3,4-tetrahydronaphthylidene ethyl dimethyl sulfonium acetate and 600 mg. of 2-methyl-4-bromocyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline 3-methoxy-8,14 - seco - 13 - methylgona - 1,3,5(10,9(11),15 - pentaene-14,17-dione is obtained by crystallization of the residue from methanol.

Example 10.—3-methoxy-8,14-seco-13-methylgona-1,3,5(10),9(11),15-pentaene-14,17-dione A mixture of 163 mg. of 6-methoxy-1,2,3,4-tetrahydronaphthylidene ethyl isothiouronium acetate and 60 mg. of 2-methyl-4-bromocyclopentane-1,3-dione and 10 ml. of acetonitrile are stirred at room temperature for two hours. Water is added and the mixture is extracted with ether. The ether extract is washed with 5% aqueous potassium bicarbonate solution and then with saturated aqueous sodium chloride solution. The ether solution is dried over magnesium sulfate, filtered, and the ether is removed by distillation under reduced pressure. The crystallization of the residue from methanol provides 3-methoxy-8,14-seco-13-methylgona-1,3,5(10),9(11),15-pentaene-14,17-dione.

Example 11.—3-methoxy-8,14-seco-13-methylgona-1,3,5(10),9(11),15-pentaene-14,17-dione A mixture of 163 mg. of 6-methoxy-1,2,3,4-tetrahydronaphthylidene ethyl isothiouronium acetate and 70 mg. of 2-methyl-4-acetoxycyclopentane-1,3-dione, 4 ml. of benzene and 4 ml. of water is stirred at 25° C. for two hours. The benzene layer is removed and the water portion is extracted with benzene. The benzene extract is combined with the original benzene layer and the combined benzene solution is washed with 5% aqueous potassium bicarbonate solution and then with saturated aqueous sodium chloride solution. The benzene solution is separated, dried over magnesium sulfate, filtered, and the benzene is removed by distillation under reduced pressure. Crystalline 3-methoxy - 8,14 - seco - 13 - methylgona - 1,3,5(10),9(11),15-pentaene-14,17-dione is obtained by crystallization of the residue from methanol.

Example 12.—3-methoxy-8,14-seco-13-methylgona-1,3,5(10),9(11),15-pentaene-14,17-dione A mixture of 320 mg. of 6-methoxy-1,2,3,4-tetrahydronaphthylidene ethyl isothiouronium chloride and 100 mg. of 2-methyl-4-bromocyclopentane - 1,3 - dione in 6 ml. of water, 4 ml. of ether and 2 ml. of chloroform is stirred at room temperature for 4 hours. Four milliliters of water are added and the mixture is extracted with chloroform. The chloroform is separated, washed with saturated aqueous sodium chloride solution, dried over magnesium sulfate, filtered, and the solvent is removed by distillation under reduced pressure. Crystalline 3-methoxy-8,14-seco-13-methylgona-1,3-5(10),9(11),15-pentaene-14,17 - dione is obtained by crystallization of the residue from methanol.

Example 13.—3-methoxy-8,14-seco-13-methylgona-1,3,5(10),9(11),15-pentaene-14,17-dione A solution of 322 mg. of 6 methoxy-1,2,3,4-tetrahydronaphthylidene ethyl isothiouronium chloride and 112 mg. of 2-methyl-4-acetoxycyclopentane-1,3-dione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate solution and then with aqueous saturated sodium chloride solution. The ether solution is dried over magnesium sulfate and filtered. The ether is removed by distillation under reduced pressure. The residue is crystalline 3-methoxy-8,14-seco-13-methylgona-1,3,5(10),9(11),15-pentaene-14,17-dione.

Example 14.—3-methoxy-8,14-seco-13-methylgona-1,3,5(10),9(11),15-pentaene-14,17-dione A mixture of 1.00 g. of 6-methoxy-1,2,3,4-tetrahydronaphthylidene ethyl dimethyl sulfonium acetate and 600 mg. of 2-methyl-4-acetoxycyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered, and the ether is removed by distillation under reduced pressure. Crystalline 3-methoxy-8,14 - seco - 13 - methylgona - 1,3,5(10),9(11),15 - pentaene-14,17-dione is obtained by crystallization of the residue from methanol.

Example 15.—3-methoxy-8,14-seco-13-methylgona-1,3,5(10),9(11),15-pentaene-14,17-dione A solution of 3.06 g. of 1-vinyl-1-hydroxy-6-methoxy-1,2,3,4-tetrahydronaphthalene and 1.14 g. of thiourea in 12 ml. of acetic acid is stirred at 25° C. for four hours. The reaction mixture is concentrated to dryness under reduced pressure. Seventy milliliters of tertiary-butanol and 1.68 g. of 2-methyl-4-acetoxycyclopentane-1,3-dione are added to the residue and the resulting mixture is refluxed for three hours. The solvent is removed by distillation under reduced pressure and ether is added to the residue. The ether solution is washed with 5% aqueous potassium bicarbonate solution and then washed with saturated aqueous sodium chloride solution. The washed ether solution is dried over magnesium sulfate, filtered, and the ether is removed by distillation under reduced pressure. The residue is crystalline 3-methoxy-8,14-seco-13-methylgona-1,3,5(10),9(11),15-pentaene-14,17-dione.

Example 16.—3-methoxy-13-methylgona-1,3,5,8(14),9(11),15-hexaen-17-one

A solution of 10 mg. of para-toluenesulfonic acid monohydrate in 10 ml. of warm benzene is taken to dryness by passing a stream of nitrogen over the solution. Eight milliliters of benzene and 195 mg. of 3-methoxy-13-methyl - 8,14 - secogona-1,3,5(10),9(11),15-pentaene-4,17-dione are added to the anhydrous para-toluenesulfonic acid solution while the latter is under nitrogen. The mixture is stirred at 60° C. for ten minutes and cooled to room temperature while being maintained under a blanket of nitrogen. The mixture is washed with 50 ml. of 5% aqueous potassium bicarbonate solution, washed with saturated aqueous sodium chloride solution, dried over magnesium sulfate, and filtered. The solvent is removed from the filtrate by distillation under reduced pressure. The residue is 3 - methoxy - 13 - methylgona-1,3,5,8(14),9(11),15-hexaen-17-one.

Example 17.—3-methoxy-13-methylgona-1,3,5(10),8(14),9(11),15-hexaen-17-one 500 milligrams of phosphorus pentoxide are added to a stirred solution of 200 mg. of 3-methoxy-13-methyl-8,14 - secogona-1,3,5(10),9(11),15-pentaene-14,17-dione in 10 ml. of benzene. The solution is kept under a blanket of nitrogen, and the temperature is at room temperature during the addition. The reaction mixture is heated at 60° C. and stirred at that temperature for 20 minutes and then cooled to room temperature and poured into 50 ml. of iced water. The phases are separated and the aqueous phase is extracted with 10 ml. of benzene. The benzene extract is combined with the organic phase and the combined benzene solution is washed with 5% aqueous potassium bicarbonate solution, washed with saturated aqueous sodium chloride solution, dried over magnesium sulfate, and filtered. The solvent is removed from the filtered solution by distillation under reduced pressure. The residue is 3 - methoxy - 13-methylgona-1,3,5(10),8(14),9(11),15-hexaen-17-one.

Example 18.—3-methoxy-13-methylgona-1,3,5(10),8(14),9(11),15-hexaen-17-one 200 milligrams of 3-methoxy-13-methyl-8,14-secogona-1,3,5(10),9(11),15-pentaene-14,17-dione are dissolved in 5 ml. of 98% formic acid by stirring under a blanket of nitrogen. The solution is maintained at 15–20° C. while forming and for one hour after solution is complete. The solution is then poured into 50 ml. of iced water and the precipitate which forms is removed by filtration. The solid is washed with water and then with ice-cold methanol and air dried. This material is 3 - methoxy - 13-methylgona-1,3,5,(10),8(14),9(11),15-hexaen-17-one.

Example 19.—8-isoestrone-3-methyl ether

A solution of 190 mg. of 3-methoxy-13-methylgona-1,3,5,8(14),9(11),15-hexaen-17-one in 5 ml. of benzene is added to a mixture of 100 mg. of pre-reduced 10% palladised charcoal in 3 ml. of benzene. The mixture is stirred under one atmosphere of hydrogen at 25° C. until no more hydrogen is absorbed. This requires about 2½ hours. The mixture is filtered through diatomaceous earth (Celite) and the solvent is removed from the filtrate by distillation under reduced pressure. The residue is crystallized from methanol and the crystalline 8-isoestrone-3-methyl ether obtained has a melting point of 150–152° C.

Example 20.—2-ethyl-4-bromocyclopentane-1,3-dione

A solution of 1.9 g. of bromine in 10 ml. of acetic acid is added dropwise to a stirred solution of 1.12 g. of 2-ethylcyclopentane-1,3-dione in 15 ml. of acetic acid. The temperature of the reaction mixture is maintained from about 15° C. to about 20° C. during the addition, which requires about one hour. After addition is complete, the mixture is stirred for two hours at room temperature and then 50 ml. of toluene are added. The solvents are removed from the reaction mixture by distillation under reduced pressure and the residue is flushed twice with 20 ml. portions of toluene and thenb rought to dryness by distillation of the solvent present under reduced pressure. The residue is 2-ethyl-4-bromocyclopentane-1,3-dione.

Example 21.—2-ethyl-4-acetoxycyclopentane-1,3-dione

A solution of 6.21 g. of 2-ethyl-4-hydroxy-cyclopentane-1,3-dione in 12 ml. of acetic anhydride and 60 ml. of pyridine is kept at room temperature for 18 hours. The solvent is removed by distillation under reduced pressure, and the residue is dissolved in 60 ml. of acetic acid and 60 ml. of water. The solution is heated on a steam bath for 90 minutes and the solvents are then removed by distillation under reduced pressure. The residue is triturated with 60 ml. of benzene and 40 ml. of chloroform. The solution is filtered and the filtrate is concentrated to dryness by distillation under reduced pressure. The residue is triturated with ether and filtered. The product is 2-ethyl-4-acetoxycyclopentane-1,3-dione.

Example 22.—6-tetrahydropyranyloxy-1,2,3,4-tetrahydronaphthylidene ethyl isothiouronium acetate A solution of 3.06 g. of 1-vinyl-1-hydroxy-6-tetrahydropyranyloxy-1,2,3,4-tetrahydronaphthalene and 0.76 g. of thiourea in 12 ml. of acetic acid is stirred at 25° C. for four hours. The mixture is diluted with 60 ml. of ether and the precipitate of 6 - tetrahydropyranyloxy-1,2,3,4-tetrahydronaphthylidene ethyl isothiouronium acetate is collected by filtration.

A solution of 10.1 g. of 1-vinyl-1-hydroxy-6-tetrahydropyranyloxy - 1,2,3,4-tetrahydronaphthalene and 3.2 g. of thiourea in 35 ml. of acetic acid is stirred at room temperature for 18 hours. The reaction mixture is concentrated to dryness and the residue is crystallized from ether. Crystalline 6 - tetrahydropyranyloxy - 1,2,3,4 - tetrahydronaphthylidene ethyl isothiouronium acetate is obtained.

Example 23.—6-hydroxy-1,2,3,4-tetrahydronaphthylidene ethyl dimethyl sulfonium acetate A solution of 3.00 g. of 1-vinyl-1-hydroxy-6-hydroxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-hydroxy-1,2,3,4-tetrahydronaphthylidene ethyl dimethyl sulfonium acetate and is purified by crystallization from ether.

Example 24.—3-methoxy-13-8,14-secogona-1,3,5(10), 9(11),15-pentaene-14,17-dione

A mixture of 500 mg. of 1-vinyl-1-hydroxy-6-methoxy-1,2,3,4-tetrahydronaphthalene, 400 mg. of 2-ethyl-4-bromocyclopentane-1,3-dione and 200 mg. of sodium acetate in 10 ml. of tertiary-butanol is refluxed under ntirogen for six hours. The mixture is cooled and the solvent is removed by distillation under reduced pressure. The residue is triturated with ether and filtered. The ether filtrate is washed with 5% aqueous potassium bicarbonate solution and then with saturated aqueous sodium chloride solution, dried over magnesium sulfate, and filtered. The solvent is removed from the filtrate by distiltaion under reduced pressure. The residue is 3-methoxy - 13 - ethyl-8,14-secogona-1,3,5(10),9(11),15-pentaene - 14,17 - dione and is dissolved in benzene-petroleum ether solvent. This solution is chromatographed on magnesium silicate (Florisil). Elution with benzene gives a purified product.

Example 25.—3-tetrahydropyranyloxy-8,14-seco-13-ethylgona-1,3,5(10),9(11),15-pentaene-14,17-dione A mixture of 1.00 g. of 6-tetrahydropyranyloxy-1,2,3,4 - tetrahydronaphthalidene ethyl isothiouronium acetate and 0.53 g. of 2-ethyl-4-acetoxycyclopentane-1,3-dione, 20 ml. of ether and 20 ml. of water is stirred at 25° C. for four hours. The ether and water are separated and the aqueous layer is extracted with ether. The ether extract and the ether layer are combined and washed with 5% aqueous potassium bicarbonate solution and then with saturated aqueous sodium chloride solution. The ether solution is dried over magnesium sulfate, filtered, and the ether is removed by distillation under reduced pressure. The residue is triturated with hexane and filtered. The insoluble 3-tetrahydropyranyloxy-8, 14 - seco - 13-ethylgona-1,3,5(10),9(11),15-pentaene-14,17-dione is obtained on filtration.

Example 26.—3 - tetrahydropyranyloxy - 8,14 - seco - 13-ethylgona-1,3,5(10),9(11),15-pentaene-14,17-dione A mixture of 1.00 g. of 6-tetrahydropyranyloxy-1,2, 3,4-tetrahydronaphthylidene ethyl dimethyl sulfonium acetate and 600 mg. of 2-ethyl-4-bromocyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered, and the ether is removed by distillation under reduced pressure. Crystalline 3 - tetrahydropyranloxy - 8,14-seco-13-ethylgona - 1,3,5(10),9(11),15 - pentaene-14,17-dione is obtained by crystallization of the residue from methanol.

Example 27.—3 - hydroxy - 13 - ethylgona - 1,3,5,8(14), 9(11),15-hexaen-17-one

A solution of 10 mg. of para-toluenesulfonic acid monohydrate in 10 ml. of warm benzene is taken to dryness by passing a stream of nitrogen over the solution. Eight milliliters of benzene and 195 mg. of 3-hydroxy-13-ethyl-8,14-secogona - 1,3,5(10),9(11),15 - pentaene-14,17-dione are added to the anhydrous para-toluenesulfonic acid solution while the latter is under nitrogen. The mixture is stirred at 60° C. for ten minutes and cooled to room temperature while being maintained under a blanket of nitrogen. The mixture is washed with 50 ml. of 5% aqueous potassium bicarbonate solution, washed with saturated aqueous sodium chloride solution, dried over magnesium sulfate, and filtered. The solvent is removed from the filtrate by distillation under reduced pressure. The residue is 3 - hydroxy - 13 - ethylgona-1,3,5,8(14),9(11),15-hexaen-17-one.

Example 28.—3-hydroxy-13-ethylgona-1,3,5(10),8(14), 9(11),15-hexaen-17-one 500 milligrams of phosphorus pentoxide are added to a stirred solution of 200 mg. of 3 - hydroxy - 13 - ethyl-8,14 - secogona - 1,3,5 (10),9(11),15 - pentaene - 14,17-dione in 10 ml. of benzene. The solution is kept under a blanket of nitrogen, and the temperature is at room temperature during the addition. The reaction mixture is heated at 60° C. and stirred at that temperature for 20 minutes and then cooled to room temperature and poured into 50 ml. of iced water. The phases are separated and the aqueous phase is extracted with 10 ml. of benzene. The benzene extract is combined with the organic phase and the combined benzene solution is washed with 5% aqueous potassium bicarbonate solution, washed with saturated aqueous sodium chloride solution, dried over magnesium sulfate, and filtered. The solvent is removed from the filtered solution by distillation under reduced pressure. The residue is 3 - hydroxy - 13 - ethylgona-1,3,5(10),8(14),9(11),15-hexaen-17-one.

Example 29.—3-hydroxy13-ethylgona-1,3,5(10),8(14), 9(11),15-hexaen-17-one 200 milligrams of 3-hydroxy-13-ethyl-8,14-secogona-1,3,5(10),9(11),15-pentaene-14,17-dione are dissolved in 5 ml. of 98% formic acid by stirring under a blanket of nitrogen. The solution is maintained at 15–20° C. while forming and for one hour after solution is complete. The solution is then poured into 50 ml. of iced water and the precipitate which forms is removed by filtration. The solid is washed with water and then with ice-cold methanol and air dried. This material is 3-hydroxy-13-ethylgona-1,3,5(10),8(14),9(11),15-hexaen-17-one.

Example 30.—3-hydroxy-13-ethyl-8α-gona-1,3,5(10)-trien-17-one

A solution of 190 mg. of 3-hydroxy-13-ethylgona-1,3,5,8(14),9(11),15-hexaen-17-one in 5 ml. of benzene is added to a mixture of 100 mg. of pre-reduced 10% palladised charcoal in 3 ml. of benzene. The mixture is stirred under one atmosphere of hydrogen at 25° C. until no more hydrogen is absorbed. This requires about 2½ hours. The mixture is filtered through diatomaceous earth (Celite) and the solvent is removed from the filtrate by distillation under reduced pressure. The residue is crystallized from methanol and the crystalline material is 3-hydroxy-13-ethyl-8α-gona-1,3,5(10)-trien-17-one.

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of a 2-lower alkyl-4-lower acyloxycyclopentane-1,3-dione which comprises reacting a 2-lower alkyl-4-hydroxycyclopentane-1,3-dione with an anhydride of a lower aliphatic acid and treating the acetylation product with an aqueous solution of the lower aliphatic acid of the acid anhydride.

2. The process according to claim 1 in which the lower aliphatic acid anhydride is acetic anhydride and the aliphatic acid in the aqueous lower aliphatic solution is acetic acid.

3. A process for the preparation of a 2-lower alkyl-4-bromocyclopentane-1,3-dione which comprises reacting a 2-lower alkylcyclopentane-1,3-dione with bromine in acetic acid solution.

4. A process for the preparation of a compound of the formula:

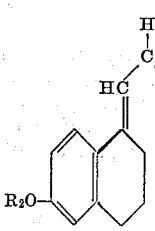

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent; which comprises reacting in an inert organic solvent a cyclopentane-1,3-dione compound of the formula:

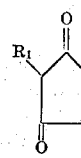

in which $R_1$ has the same significance as above; and Z is bromine or a lower hydrocarbon carboxylic acyloxy substituent, with a compound of the formula:

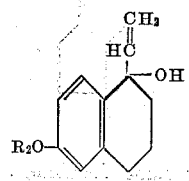

in which $R_2$ has the same significance as above, or reacting in an inert organic solvent, an organic solvent-water solvent mixture, or water alone, the cyclopentane-1,3-dione compound with a sulfonium salt of the formula:

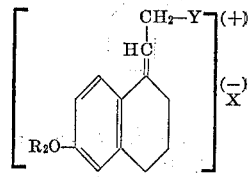

in which $R_2$ has the same significance as above; Y is a substituent of the formula:

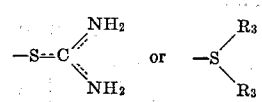

in which $R_3$ is a lower alkyl substituent; and X is the anion of an acid selected from the group consisting of strong mineral acids, lower aliphatic and lower aromatic acids.

5. A process for the preparation of a compound of the formula:

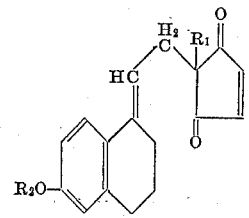

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent; which comprises reacting in an inert organic solvent a cyclopentane-1,3-dione compound of the formula:

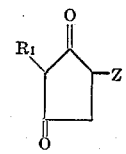

in which $R_1$ has the same significance as above and Z is bromine or a lower hydrocarbon carboxylic acyloxy substituent, with a compound of the formula:

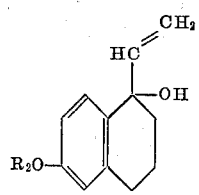

in which $R_2$ has the same significance as above.

6. A process for the preparation of a compound of the formula:

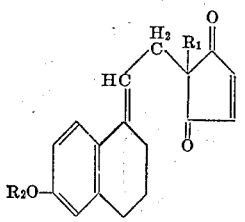

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent; which comprises reacting a cyclopentane-1,3-dione compound of the formula:

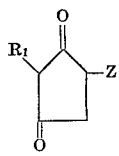

in which $R_1$ has the same significance as above; and Z is bromine or a lower hydrocarbon carboxylic acyloxy substituent; in an inert organic solvent, an organic solvent-water solvent mixture, or water alone, with a sulfonium salt of the formula:

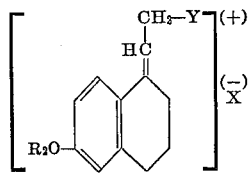

in which $R_2$ has the same significance as above; Y is a substituent of the formula:

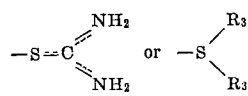

in which each $R_3$ is a lower alkyl substituent; and X is the anion of an acid selected from the group consisting of strong mineral acids, lower aliphatic and lower aromatic acids.

7. A process for the preparation of a compound of the formula:

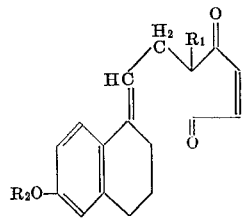

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent; which comprises reacting in an inert organic solvent, an organic solvent-water solvent mixture, or water alone, a cyclopentane-1,3-dione compound of the formula:

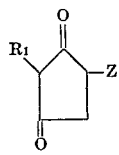

in which $R_1$ has the same significance as above; and Z is bromine or a lower hydrocarbon carboxylic acyloxy substituent, with a sulfonium salt of the formula:

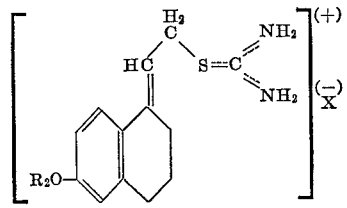

in which $R_2$ has the same significance as above, and X is the anion of an acid selected from the group consisting of strong mineral acids, lower aliphatic and lower aromatic acids.

8. A process for the preparation of a compound of the formula:

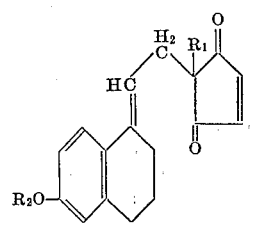

in which $R_1$ is a lower alkyl substituent; and $R_2$ is hydrogen, a lower cycloaliphatic, a straight or branch-chained lower alkyl substituent, an aryl, alkaryl or aralkyl substitutent, or a heterocyclic substituent; which comprises reacting in an inert organic solvent, organic solvent-water mixture, or water alone, a cyclopentane-1,3-dione compound of the formula:

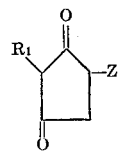

in which $R_1$ has the same significance as above; and Z is bromine or a lower hydrocarbon carboxylic acyloxy substituent, with a sulfonium salt of the formula:

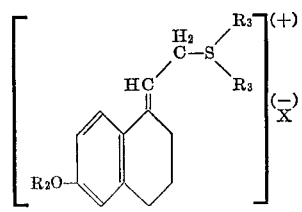

in which $R_2$ has the same significance as above, each $R_3$ is a lower alkyl substituent, and X is the anion of an acid selected from the group consisting of strong mineral acids, lower aliphatic and lower aromatic acids.

9. A process for the preparation of a compound of the formula:

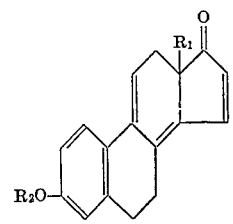

in which $R_1$ is a lower alkyl substituent; and $R_2$ is hydrogen, a lower cycloaliphatic, a straight or branch-chained lower alkyl substituent, an aryl, alkaryl or aralkyl substitutent, or a heterocyclic substituent; which comprises reacting in an organic solvent a cyclopentane-1,3-dione compound of the formula:

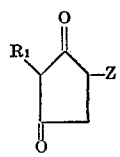

in which $R_1$ has the same significance as above; and Z is bromine or a lower hydrocarbon carboxylic acyloxy substituent, with a compound of the formula:

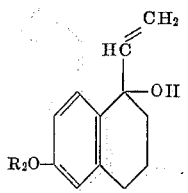

in which $R_2$ has the same significance as above; or reacting in an inert organic solvent, an organic solvent-water solvent mixture, or water alone, the cyclopentane-1,3-dione compound with a sulfonium salt of the formula:

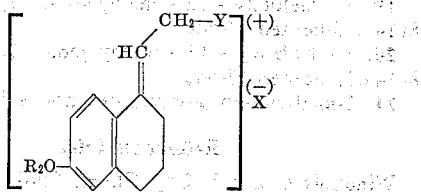

in which $R_2$ has the same significance as above; Y is a substituent of the formula:

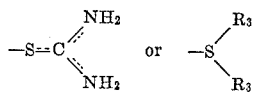

in which each $R_3$ is a lower alkyl substituent; and X is the anion of an acid selected from the group consisting of strong mineral acids, lower aliphatic and lower aromatic acids; to provide a compound of the formula:

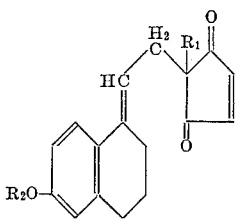

in which $R_1$ and $R_2$ have the same significance as above; and reacting the latter compound in solution in an organic solvent with an acid.

10. A process for the preparation of a compound of the formula:

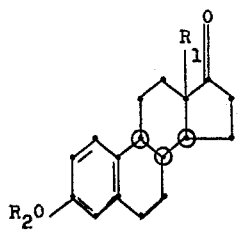

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent; which comprises reacting in solution in an inert organic solvent a cyclopentane-1,3-dione compound of the formula:

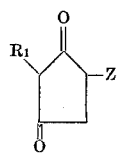

in which $R_1$ has the same significance as above; and Z is bromine or a lower hydrocarbon carboxylic acyloxy substituent, with a compound of the formula:

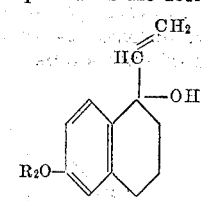

in which $R_2$ has the same significance as above; or reacting in an inert organic solvent, organic solvent-water solvent mixture, or water alone, the cyclopentane-1,3-dione compound with a sulfonium salt of the formula:

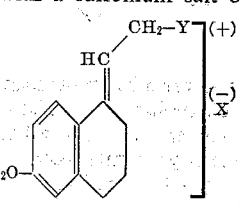

in which $R_2$ has the same significance as above; Y is a substituent of the formula:

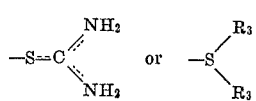

in which each $R_3$ is a lower alkyl substituent; and X is the anion of an acid selected from the group consisting of strong mineral acids, lower aliphatic and lower aromatic acids; to provide a compound of the formula:

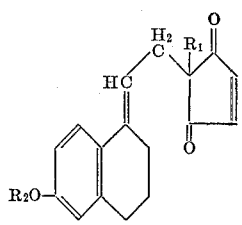

in which $R_1$ and $R_2$ have the same significance as above; reacting the latter compound in solution in an organic solvent with an acid, to provide a compound of the formula:

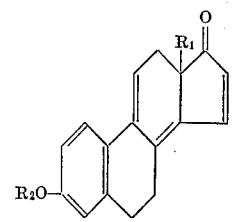

in which $R_1$ and $R_2$ have the same significance as above; and hydrogenating the latter compound, except that if $R_2O$ is benzyloxy or substituted benzyloxy it is converted to hydroxy by hydrogenation.

11. A compound of the formula:

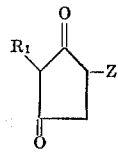

in which $R_1$ is a lower alkyl substituent, and Z is bromine or a lower hydrocarbon carboxylic acyloxy substituent.

12. 2-lower alkyl-4-lower acyloxycyclopentane-1,3-dione.
13. 2-methyl-4-acetoxycyclopentane-1,3-dione.
14. 2-lower alkyl-4-bromocyclopentane-1,3-dione.
15. A compound of the formula:

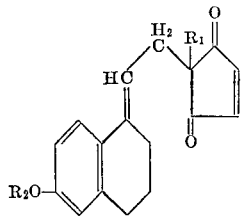

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent.

16. 3 - methoxy - 13 - methyl - 8,14 - secogona - 1,3,5(10),9(11),15-pentaene-14,17-dione.
17. 3 - hydroxy - 13 - methyl - 8,14 - secogona - 1,3,5(10),9(11),15-pentaene-14,17-dione.
18. A compound of the formula:

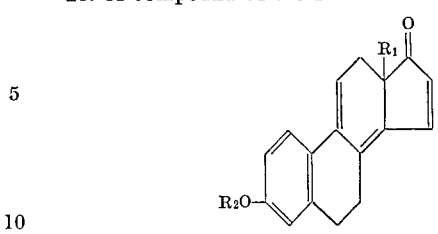

in which $R_1$ is a lower alkyl substituent; and $R_2$ is hydrogen, a lower cycloaliphatic, a straight or branch-chained lower alkyl substituent, an aryl, alkaryl or aralkyl substituent, or a heterocyclic substituent.

19. 3 - methoxy - 13 - methylgona - 1,3,5(10),9(11),8(14),15-hexaen-17-one.
20. 3 - hydroxy - 13 - methylgona - 1,3,5(10),9(11),8(14),15-hexaen-17-one.
21. 2-methyl-4-bromocyclopentane-1,3-dione.

References Cited

Windhols et al.: J. Org. Chem. (1963), pages 1092–1094.

ELBERT L. ROBERTS, *Primary Examiner.*